Jan. 7, 1930.					F. A. HOWARD					1,743,076
MOTOR VEHICLE TRANSMISSION
Filed July 6, 1925					3 Sheets-Sheet 1
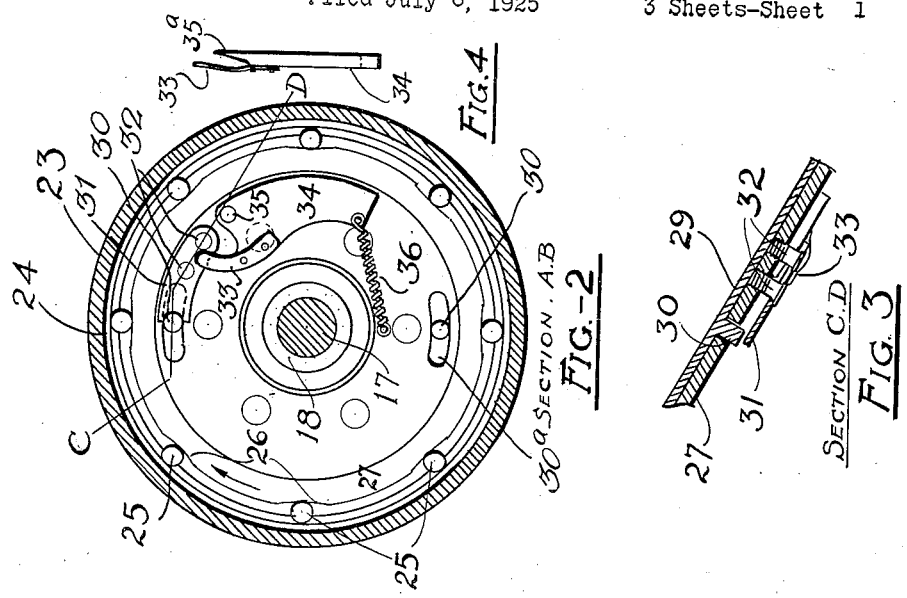
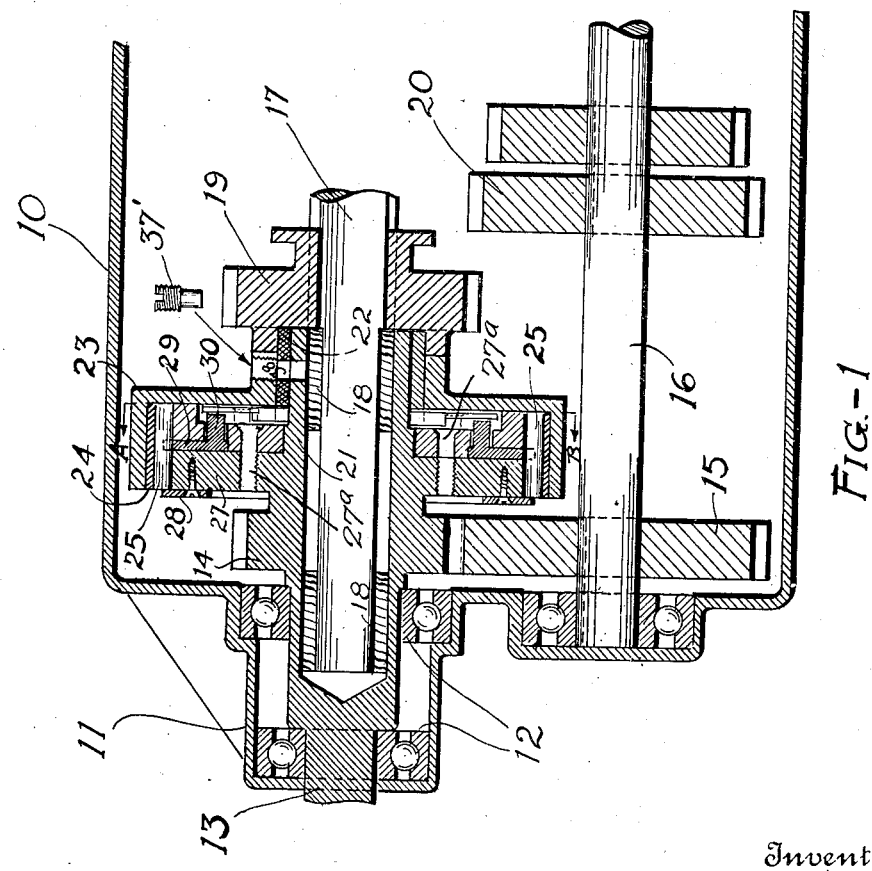
Inventor
Frank A Howard
By Attorney Joseph W. Morrison

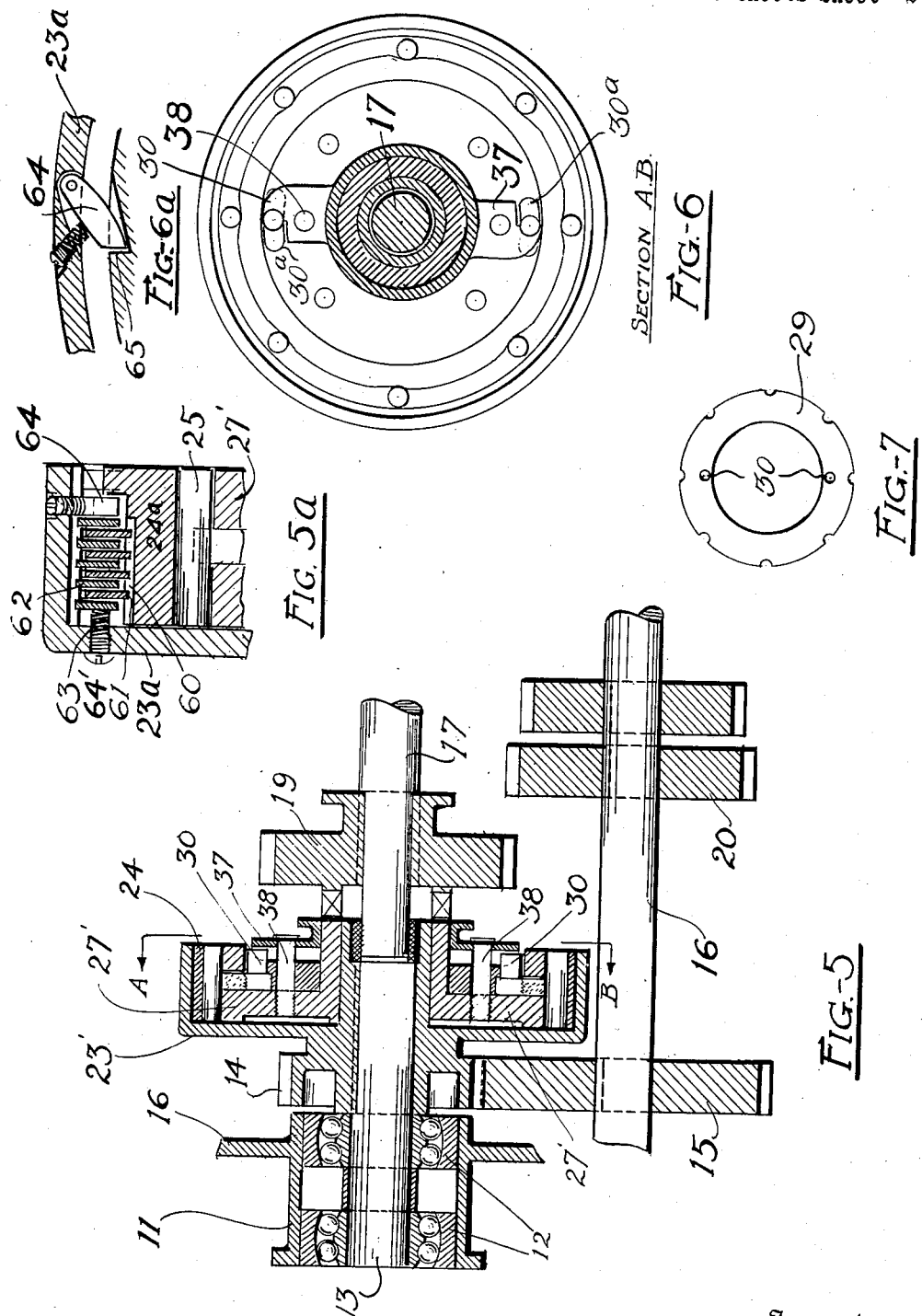

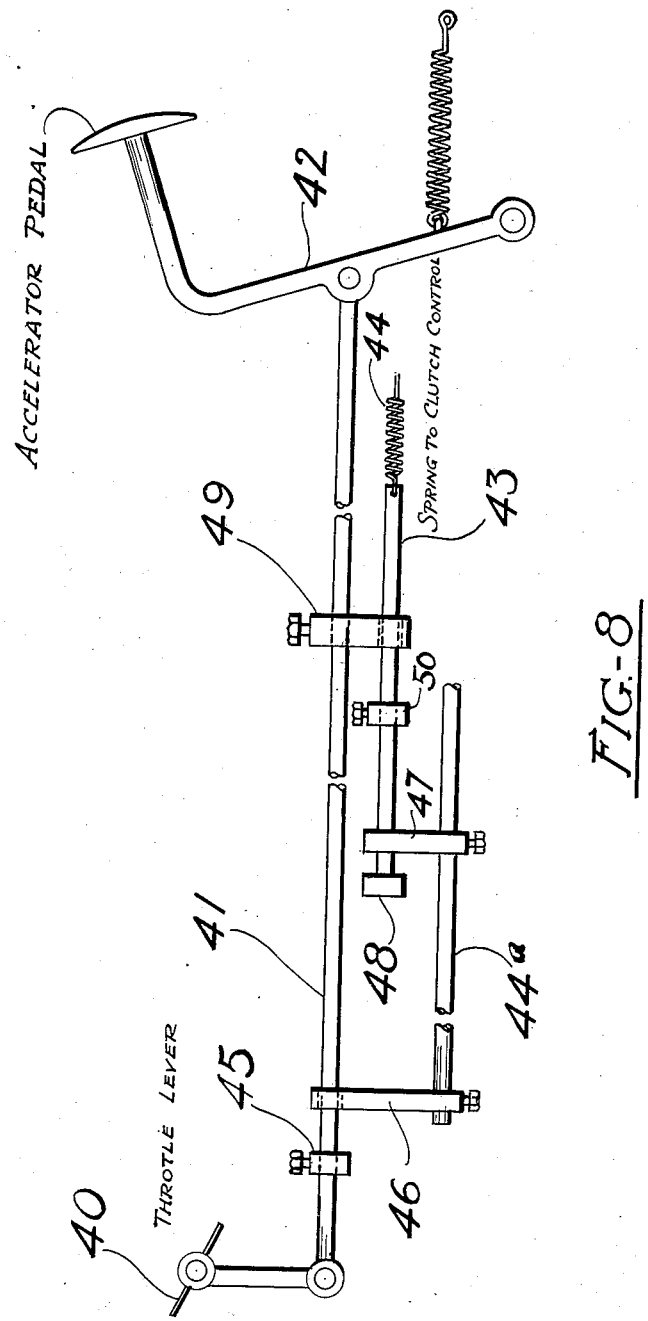

Patented Jan. 7, 1930

1,743,076

UNITED STATES PATENT OFFICE

FRANK A. HOWARD, OF ELIZABETH, NEW JERSEY, ASSIGNOR TO ETHYL GASOLINE CORPORATION, A CORPORATION OF DELAWARE

MOTOR-VEHICLE TRANSMISSION

Application filed July 6, 1925. Serial No. 41,639.

My invention relates to improvements in motor vehicle transmissions and will be fully understood from the following specification, taken in connection with the accompanying drawings.

In these drawings, Figure 1 is a fragmentary longitudinal vertical central section through a conventional form of sliding-gear transmission of the type in general use in automobiles at the present time; Figure 2 is a sectional view taken on the line A—B of Figure 1; Figure 3 is a section on the line C—D of Figure 2; Figure 4 is a detailed side elevation of the centrifugal control member illustrated in Figure 2; Figure 5 is a view similar to Figure 1 but showing a modified construction of the apparatus; Figure 5A is an enlarged detailed fragmentary section showing a modification of the clutch mechanism shown complete in Figure 5; Figure 6 is a section on the line A—B of Figure 5; Figure 6A is an enlarged fragmentary end view of the construction shown in Figure 5A; Figure 7 is a detail face view of the roller control ring; and Figure 8 is a diagrammatic illustration of a form of linkage which may be employed for operating the clutch mechanism shown in Figures 5 to 7.

Referring more particularly to the drawings, the numeral 10 in Figure 1 designates the gear-box housing, which is provided with an offset 11 containing suitable bearings 12 for the mounting of the stub-shaft 13. This stub-shaft is operatively connected to the main clutch of the motor vehicle, to be driven by the motor through the main clutch in the well understood manner. The stub-shaft carries the main driving gear 14, which meshes with the main pinion 15 on the counter-shaft 16 of the transmission, all as in ordinary practice. The main shaft 17 of the transmission is journaled in bearings 18 in the end of the stub-shaft 13. The main shaft carries the usual sliding gears, which cooperate with corresponding pinions on the counter-shaft 16 in the ordinary way. Of these sliding gears, only the one designated 19 is illustrated, this being what is known as the second-and-high-speed gear. This gear when moved to the left, as shown in Figure 1, engages with the stub-shaft 13 in a manner which will later be described, to drive the main shaft 17 from the stub-shaft directly; or, when moved to the right, as viewed in Figure 1, occupies first a neutral position, in which it is free from engagement with any other mechanism in the gear-box; or, when moved still further to the right, engages the second speed counter-shaft gear, designated 20, thus securing drive of the main shaft 17, at a reduced speed with reference to the stub-shaft 13, through the gears 14—15 and counter-shaft 16.

The stub-shaft 13 is extended beyond the main driving gear 14 to provide a hub 21, over which there is sleeved a bearing bushing 22. Mounted for free rotation on the bushing 22, there is a flanged wheel 23, the right-hand end of which has teeth, or jaws, arranged to cooperate with the jaws of the second-and-high-speed gear 19. The direct drive from the stub-shaft 13 to the main shaft 17 must therefore be transmitted through the flanged wheel 23, since this member alone cooperates directly with the second-and-high-speed gear 19. To transmit the drive from the stub-shaft 13 to the flanged wheel 23, there is provided a roller clutch mechanism, constructed as follows:

Fitted nicely within the periphery of the flange of the wheel 23 is a metallic ring 24, the inner surface of which forms the bearing member for a series of clutch rollers 25. These clutch rollers operate in curved depressions 26 in the periphery of a drum member 27 formed integrally with the stub-shaft 13. The depressions 26 are of symmetrical form and slightly curved at both extremities, as shown in Figures 2 and 6. The distance between the bottom of the depressions 26 and the bearing ring 24 very slightly exceeds the diameter of the rollers 25, so that when the rollers are located in the bottoms of the depressions they just clear the inner periphery of the ring 24. The rollers are retained in position between the faces of the drum 27 and the bearing ring 24 by a washer 28 fastened to the face of the drum 27, as shown in Figure 1. The entire group of rollers 25, of which eight are illustrated in Figure 2, are carried by a cage ring, designated 29, shown in section in Figure 1 and in detail in Figure 7. The cage ring 29 operates in a circumferential slot in the drum 27, which is made in two pieces to permit of assembly, the two parts being held together by screws 27A, in a well understood manner. The cage ring 29 carries at diametrically opposite points studs 30, which project through short arcuate slots 30ª in the right-hand face of the drum 27 and into a cavity between the face of the drum and the flanged wheel 23. The outer diameter of the cage ring 29 is somewhat less than the internal diameter of the bearing ring 24, the cage ring being notched in its outer periphery to locate and maintain the relative positions of the rollers 25. The movement of the roller cage 29 in a clockwise direction (as illustrated in Figure 2) is limited by a dog 31 freely mounted on a pair of headed studs 32 fixed in the face of the drum 27. In its normal position the dog 31 lies against the face of the drum 27, thereby stopping the clockwise movement of the cage ring 29 at the point at which the stud 30 thereof is at the approximate center of the arcuate slot 30ª, which point also coincides, so far as the rollers 25 are concerned, with the centers of the depresisons 26. This normal inner position of the dog 31 is the result of the pressure of a small leaf spring 33, which bears on the outer face of the dog and is carried by the toe of a pivoted centrifugal control member 34, illustrated in Figures 2 and 4. The centrifugal control member is of a generally arcuate form, being pivoted freely on a stud 35 carried by the drum 27 and normally having its free end drawn radially inward by a tension spring 36 fixed at one end of the drum 27 and at the other end to the free end of the centrifugal control member 34. A cam or wedge-shaped toe 35ª formed on the end of the centrifugal control member is adapted to enter between the inner face of the dog 31 and the outer face of the drum 27.

The flanged wheel 23 may be positively locked to the stub-shaft 13 at will by the insertion of locking studs 37', for which appropriate recesses 38 are formed in the hub of the wheel and in the projected hub 21 of the stub-shaft 13. These locking screws, of which one only is illustrated but of which any number desired may be employed, are intended to render inoperative the whole of the clutch mechanism just described, that is, when they are put in place the flanged wheel 23 becomes in effect an integral part of the stub-shaft 13.

The operation of the mechanism heretofore described is as follows:

The stub-shaft 13 being driven through the motor and main clutch of the motor vehicle in the ordinary way, drive is transmitted through the gears 14 and 15 to the countershaft and thence to the main drive-shaft 17, thence to the driving wheels of the vehicle in the ordinary manner for all positions of the mechanism save the position shown in Figure 1, i. e., the direct or high-speed position. In this position of the mechanism the drive is transmitted through the drum 27 formed on the stub-shaft, thence through the clutch rollers 25 and ring 24 to the wheel 23, and from the hub of this wheel only to the second-and-high-speed gear 19. Engagement of the roller clutch, necessary to transmit the drive as described, is effected by slight angular movement of the drum 27 in a clockwise direction, as shown in Figure 2, that is in the normal direction of rotation of the motor of the automobile. Such slight angular motion of the drum 27 relatively to the ring 24 causes the clutch rolls 25 to exert a wedging action upon the ring 24, thus expanding or distorting the ring slightly and causing it to grip the inner face of the wall 25 with a force greater than the normal frictional drag between these nicely fitted parts. Such increase in friction between the bearing ring 24 and the confining flange of the wheel 23 results in further wedging action by the rolls, with consequent increase of friction, this cycle being self-perpetuating and increasing in rapidity and force, so that a very small angular movement is sufficient to cause the ring 24 to entirely squeeze out any lubricant film which may lie between its outer surface and the inner surface of the wheel 23, thus gripping and binding at this point, the rolls themselves in turn gripping and binding in a locked position on the inner face of the ring. It will be understood that this operation is identical with that of the ordinary roller clutch save for the interposition of the ring 24. The purpose of this interposed ring is two-fold, i. e., to reduce wear on the rolls during free operation of the clutch, that is, when it is overrunning, and to secure a somewhat smoother and less sudden and destructive gripping action than is attainable with the ordinary roller clutch. It will be understood that the ring 24 may be omitted from the construction, in which case the rolls 25 operate directly against the inner cylindrical surface of the flanged wheel. This construction is not only simpler but more positive, and may in many instances be preferred for those reasons.

Normal drive of the vehicle is therefore accomplished in the manner described from the drum 27 of the stub-shaft 13 to the wheel 23. If the speed of the driving motor, and hence of the stub-shaft 13, is permitted to fall below the speed of the main shaft 17—as, for example, by throttling the motor to the idling position while the vehicle is in motion at an ordinary rate—the clutch mechanism described overruns in the ordinary way; that is to say, the main shaft 17 and the flanged wheel 23 to which it is connected are free to to overrun the stub-shaft 13. The position of the parts in such overrunning action is shown in Figure 2, the rollers having returned to their central position in the depressions 26 and the ring 24 having resumed its normal size and shape, under which conditions it has a sliding fit within the flange of the wheel 23. The rolls are prevented from wedging themselves on the right-hand slope of the depressions 26 as viewed in Figure 2 by the action of the dog 31, which stops the motion of the roll cage at the point shown through the stud 30 which is carried thereon abutting the end of the dog.

During the operation above described, it is assumed that the dog 31 occupies its normal position, in contact with the face of the drum 27. This condition will obtain so long as the stub-shaft 13 rotates at a speed sufficient to maintain the centrifugal control member 34 in the normal position shown in Figure 2. I prefer to adjust the tension of the spring 36 so that such position of the control member will be maintained down to the lowest practical idling speed of the engine which drives the vehicle, for example, from 100 to 500 R. P. M., depending upon the type and condition of the motor employed. Should the motor drop below this predetermined speed, the tension of the spring 36 will cause the wedge-shaped toe 35$^a$ of the control member to raise the dog 31 away from the face of the drum 27 into position shown in Figure 3. This action will permit the roll cage to continue to move in a clockwise direction, as shown in Figure 2, and as the rolls exert their wedging action in the right-hand portions of the depressions 26, the roller clutch again becomes operative in a reverse direction, but in a manner exactly the same as heretofore described, and drive is now transmitted from the main shaft 17 to the stub-shaft 13, thus causing the motor to be driven directly and positively from the main shaft at the speed of the latter. This condition is maintained so long as the driving force is transmitted through the mechanism in the direction given. As soon as the motor accelerates so as to transmit the drive in the opposite direction, the roller clutch reverses, that is, returns to the normal driving position, and in such return, as the stud 30 passes beyond the end of the dog 31 as shown in Figure 3, the dog again assumes, under the pressure of the leaf spring 33, its normal position against the face of the drum 27. Should the motor again be reduced below the speed of the main shaft 17, but not below the speed at which the governor 34 comes into action, the clutch will again function as a coasting device, in the manner described.

As applied to the operation of a motor vehicle, therefore, the mechanism above described performs the following general functions:

Power is transmitted positively in both directions from the motor to the rear wheels of the vehicle in all positions of the transmission mechanism save the direct or high-speed position; this is in accordance with standard practise. In the direct of high-speed driving position of the transmission mechanism, power is transmitted from the motor to the vehicle but not from the vehicle to the motor so long as the motor maintains a normal predetermined minimum speed, i. e., the safe idling speed of the motor. This permits the vehicle to coast, that is, to proceed under its own inertia or the action of gravity, without imposing the braking action of the motor upon the vehicle. When and if the motor shall drop below the predetermined safe idling speed, as for example when it starts to die, the centrifugal control mechanism described operates instantaneously to cause power to be transmitted from the vehicle to the motor to maintain the latter at a speed consonant with the vehicle's speed, which condition of enforced rotation of the motor continues until such time as the motor again assumes the driving load, whereupon the parts return to their normal positions and operate as above described.

In Figures 5 and 6, I have illustrated a modification of the mechanism heretofore described, in which modification similar parts bear the same numerals as before. The two major differences between the construction shown in Figures 5 and 6 as compared with that heretofore described are that the position of the parts of the roller clutch is reversed, and that manual positive control, in lieu of automatic control, of the reversal action of the clutch is obtained.

Thus, in Figures 5 and 6, the flanged wheel member of the roller clutch, here designated 23', is formed integrally with the stub-shaft 13, whereas the drum member thereof, designated 27', co-acts with the second-and-high-speed gear 19. Otherwise the relation and operation of these parts is the same. In lieu of the centrifugal control member 34, the construction shown in Figures 5 and 6 utilizes a shiftable fork 37, sleeved over the hub of the drum 27' and slidable longitudinally on pins 38 affixed to the drum 27'. The shiftable fork 37 has diametrically opposite arms, which lie in the path of and serve as stops for the studs 30 on the roller cage ring. It will be understood that the shiftable member 37 may be advanced and retarded toward and away from the drum 27' by the ordinary type of shifter fork mechanism employed to operate the sliding gears of a transmission, which mechanism is well-known and is not here illustrated. In the inward or left-hand position of the member 37, as shown in Figure 5, the operation of the parts corresponds with the normal operation described in connection with Figures 1 and 2, that is, in this position of the parts the cage ring is prevented from moving in a clockwise direction and therefore power may be transmitted from the stub-shaft 13 to the main shaft 17 in one direction only, that is, in a normal driving direction. When the member 37 is moved to the right, or away from the face of the drum 27', the roller clutch mechanism operates in either direction, and, except for the slight lost motion necessary for the operation of the clutch, the stub-shaft 13 and main shaft 17 are to all intents and purposes directly and positively connected for power transmission in either direction.

In Figure 8 I have shown diagrammatically a preferred means for operating the member 37. In this view, the numeral 40 designates the throttle of the engine carbureter, and the numeral 41 designates the throttle-operating link, which extends forwardly to the accelerator pedal 42 of the vehicle. The numeral 43 designates a link which through a spring 44 operates the fork by which the member 37 is shifted. It will be understood that another spring, not illustrated, holds the member 37 normally against the face of the drum 27'. The numeral 44ª designates a link operatively connected with the hand throttle lever of the vehicle, which is normally located on the steering post. The main throttle link 41 has an adjustable stop member 45 affixed thereon arranged to cooperate with an arm 46 affixed to the link 44ª and slidable on the link 41. A second arm 47 affixed to the link 44 and slidable upon the link 43 cooperates with a head 48 on the end of the link 43. A third arm 49 affixed to the link 41 and slidable on the link 43 cooperates with an adjustable stop 50 affixed to the link 43. It will be observed that the distance between the arm 47 and the stop 48 is less than the distance between the arm 46 and the stop 45; also that there is a considerable gap between the arm 49 and the corresponding stop 50. The parts as illustrated in Figure 8 are in the normal position which they occupy when the hand throttle lever or similar device is in the "off" position, and the accelerator pedal likewise in the "off" position. This corresponds to the idling position of the throttle 40. Under these conditions, the member 37 occupies the position in which it is shown in Figure 5, and the clutch device to which the present invention relates operates in its normal fashion as an overrunning clutch, to permit power to be transmitted from the motor to the vehicle but not from the vehicle to the motor. Owing to the lost motion between the arm 49 and stop 50, the normal or ordinary movement of the accelerator pedal required to operate the throttle 40 beyond the point at which it is opened in ordinary operation of the vehicle does not cause any movement of the link 43; therefore the clutch control fork 37 remains in its normal position. If, however, the accelerator pedal be depressed to its full limit the arm 49 picks up the stop 50, thus moving the link 43 and withdrawing the fork 37 from the face of the drum 27'. Under these conditions, the roller clutch operates in both directions, that is, it permits power to be transmitted both from the motor to the vehicle and from the vehicle to the motor. This method of control of the roller clutch is particularly desirable, since without loss of time or additional motion other than continued pressure upon the accelerator pedal it is possible for the operator of the vehicle at any time, and either for the purpose of starting a stalled motor or for the purpose of using the motor as a brake, to cause the coaster clutch to cease to function as a coaster.

By initial operation of the hand throttle lever, that is, by setting it up on its control quadrant to an extent less than is required to take up the lost motion between the arm 46 and the stop 45 and thereby effect the opening of the carbureter throttle 40, the arm 47 on the link 44ª engages the head 48 of the link 43 and throws the clutch control member 37 to the inoperative position. By this means, therefore, and without the addition of any separate control member, it is possible for the operator of the vehicle at will to throw out of operation the coaster clutch and to maintain it out of operaion as long as is desired merely by moving up the hand throttle control to a point short of that at which it affects the throttle of the carbureter.

In Figures 5A and 6A, I have illustrated a further modification of the mechanism, the purpose of which is to provide for greater smoothness of operation and less shock to the parts from the engagement of the roller clutch, either in one direction or in both directions. This result is attained by interposing a multiple disk friction clutch between the ring member and the wheel member of the roller clutch device. In Figure 5A, the numeral 24A designates the ring member which corresponds with the ring 24 of Figures 1 and 5. In lieu of being flexible and capable of distortion or expansion, the ring 24A is of adequate size and strength to be practically rigid. The ring member 24A has longitudinal key-ways 60 in its outer periphery, with which there cooperates a series of annular friction washers or discs 61. Similarly, the inner periphery of the wheel, which is here designated 23A, has corresponding key-ways which serve to drive a complementary set of friction washers 62. The two sets of washers, i. e., the set carried by the ring 24A and the set carried by the wheel 23A, are held in frictional contact by a plurality of springs 63 mounted in the wheel 23A and pressing the entire group of washers or discs together and against stop screws 64' set in the flange of the wheel 23A. The friction clutch, made up of the two sets of discs 61—62, may be used to transmit the drive in both directions from ring 24A to wheel 23A, in which case it must be capable of carrying the full driving torque of the motor; or, preferably, torque may be transmited through this friction clutch only in the reverse direction, that is, from the main shaft 17 to the stub-shaft 13. To accomplish this result, the wheel 23A may be provided with a series of spring-presed pawls 64 which engage corresponding ratchet teeth 65 in the periphery of the ring 24A. By this arrangement, the transmission of the normal driving torque from the wheel 23A to the ring 24A and thence through the roller clutch to the main shaft 17 is positively effected by the pawl and ratchet device. In this case the friction clutch interposed between these two members need carry only the reverse driving torque, which is the torque required to turn over the driving motor when it is driven from the vehicle. This construction is preferred as being considerably more compact, owing to the smaller load which must be carried by the friction clutch, and as further attaining the most important function of protecting the mechanism from shock. It will be understood that in the normal operation of the coaster clutch the shock on the rolls and cooperating parts thereof is limited to the acceleration of the motor in the angle of movement required to engage the roller clutch, which acceleration is a very small amount. Where the power is to be transmitted in the reverse direction, however, particularly for the purpose of starting a stalled motor from the main shaft 17, the shock on the parts is limited only by the inertia of the motor and the speed of the shaft 17 at the time the driving mechanism engages. It is particularly desirable to obviate this shock. This result is attained by the mechanism illustrated in Figures 5A and 6A. It will be understood that the construction shown in Figures 5A and 6A may be used either in the device illustrated in Figures 1 and 2 or in the device illustrated in Figures 5 and 6.

While I have in the foregoing described in considerable detail the construction and operation of particular types of mechanism embodying my present invention, it will be understood that this is illustrative only and for the purpose of making clear the nature and manner of employing the invention, and that the invention is not to be regarded as limited to the precise mechanism illustrated nor to any detail thereof, except in so far as such limitations are embodied in the terms of the appended claims, in which it is my intention to claim all novelty inherent in the invention as broadly as is permissible in view of the state of the prior art.

What I claim is:

1. A mechanism for transmitting power from an internal combustion engine to the driving wheels of a motor vehicle and comprising an overrunning clutch normally permitting transmission of power only from the motor to the vehicle, and in combination therewith means operatively connected to the throttle control mechanism of the motor and operated by the opening movement of said control mechanism to render the clutch operative in either direction.

2. A mechanism as described in claim 1, and further characterized by the fact that lost motion is provided between the throttle control mechanism and the overrunning clutch mechanism to permit substantial opening of the throttle before engaging the clutch control mechanism.

3. A mechanism as described in claim 1, and further characterized by the fact that the clutch control mechanism is engaged and operated by motion of the hand throttle mechanism before the latter becomes effective to operate the throttle.

4. A mechanism as described in claim 1, and further characterized by the fact that lost motion is provided between the throttle control mechanism and the overrunning clutch mechanism to permit substantial opening of the throttle before engaging the clutch control mechanism, and also characterized by the fact that the clutch control mechanism is engaged and operated by motion of the hand throttle mechanism before the latter becomes effective to operate the throttle.

FRANK A. HOWARD.